United States Patent
Bourgeas et al.

(10) Patent No.: US 10,122,119 B2
(45) Date of Patent: Nov. 6, 2018

(54) PLURALITY OF PLUGS WITH LOCKING LEVERS COUPLED TO A PLURALITY OF SOCKETS FORMED INTEGRALLY WITH AN ELECTRICAL EQUIPMENT BOX PANEL

(71) Applicant: RADIALL, Aubervilliers (FR)

(72) Inventors: Fabien Bourgeas, Saint Nicolas de Macherin (FR); Dominique Lomuscio, Sillans (FR); Benoit Dupeux, Vatilieu (FR)

(73) Assignee: RADIALL, Aubervilliers (FR)

( * ) Notice: Subject to any disclaimer, the term of this patent is extended or adjusted under 35 U.S.C. 154(b) by 0 days.

(21) Appl. No.: 15/643,224

(22) Filed: Jul. 6, 2017

(65) Prior Publication Data

US 2018/0013232 A1    Jan. 11, 2018

(30) Foreign Application Priority Data

Jul. 7, 2016 (FR) ..................................... 16 56515

(51) Int. Cl.
| | |
|---|---|
| *H01R 13/627* | (2006.01) |
| *H01R 13/629* | (2006.01) |
| *H01R 9/24* | (2006.01) |
| *H01R 12/71* | (2011.01) |

(Continued)

(52) U.S. Cl.
CPC ..... *H01R 13/62922* (2013.01); *G02B 6/3893* (2013.01); *G02B 6/3897* (2013.01);
(Continued)

(58) Field of Classification Search
CPC .............. H01R 13/518; H01R 13/6271; H01R 13/6275; H01R 13/639; H01R 13/665;
(Continued)

(56) References Cited

U.S. PATENT DOCUMENTS

| | | | |
|---|---|---|---|
| 9,004,778 B2 * | 4/2015 | Isenhour .............. | G02B 6/3831 385/77 |
| 9,170,385 B2 * | 10/2015 | Van Der Mee ...... | G02B 6/4201 |

(Continued)

OTHER PUBLICATIONS

English translation of French search report for french application 1656515 dated Jun. 9, 2017.*

(Continued)

*Primary Examiner* — Chandrika Prasad
(74) *Attorney, Agent, or Firm* — Arent Fox LLP

(57) ABSTRACT

The present invention concerns a connection system comprising:
a plurality of connection plugs on each of which is mounted a locking lever with two arms each one supporting a locking hook of a locking system,
an assembly comprising:
an electrical equipment box panel, designed to lodge an electronic circuit card, the panel comprising a plurality of openings;
a plurality of adjacent sockets.
According to the invention, the plurality of sockets is monobloc with the equipment panel and the sockets and the plugs are configured such that when each plug is connected to one of the sockets and locked to the latter by means of the locking lever in the position of attachment of the hooks to the locking lugs of the socket, two adjacent arms of adjacent plugs are in planar, pointlike or linear bearing against each other.

13 Claims, 4 Drawing Sheets

(51) Int. Cl.
 *H01R 13/66* (2006.01)
 *G02B 6/38* (2006.01)
 *G02B 6/42* (2006.01)
(52) U.S. Cl.
 CPC .......... *G02B 6/4293* (2013.01); *H01R 9/2491* (2013.01); *H01R 12/712* (2013.01); *H01R 13/6275* (2013.01); *H01R 13/665* (2013.01)
(58) Field of Classification Search
 CPC ............ H01R 13/62922; H01R 9/2491; H01R 12/712; H01R 13/527; H01R 13/627; G02B 6/3893; G02B 6/3897; G02B 6/4293
 USPC ...... 439/299, 352, 355, 358; 385/53, 76, 88, 385/92
 See application file for complete search history.

(56) References Cited

U.S. PATENT DOCUMENTS

| | | |
|---|---|---|
| 2003/0139082 A1* | 7/2003 | Aramoto ............ H01R 13/6273 439/358 |
| 2004/0156595 A1 | 8/2004 | Stockhaus et al. |
| 2013/0294731 A1 | 11/2013 | Van Der Mee et al. |
| 2014/0003771 A1 | 1/2014 | Isenhour et al. |
| 2015/0378109 A1* | 12/2015 | Samal .................. G02B 6/3809 385/58 |

OTHER PUBLICATIONS

French Search Report of related French application 1656515 dated Jun. 9, 2017.

* cited by examiner

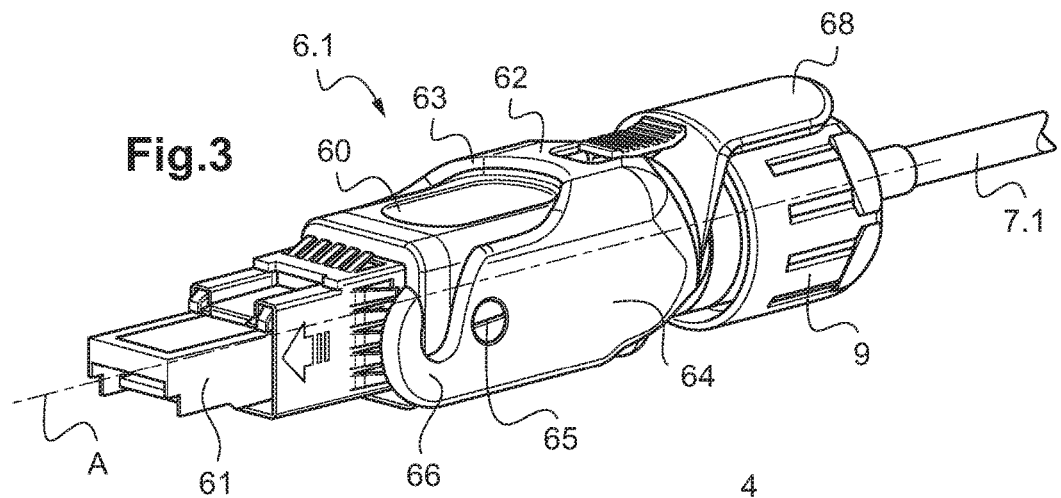
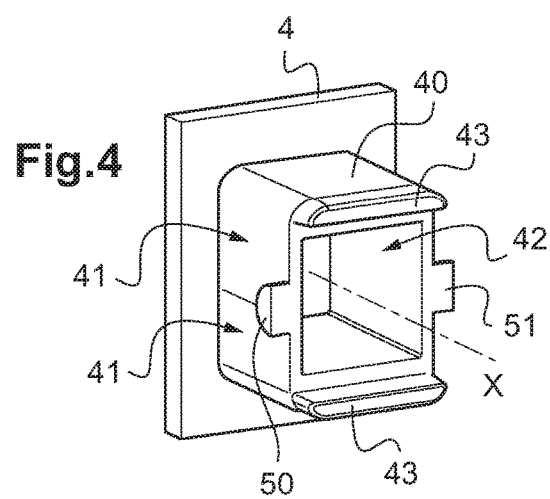
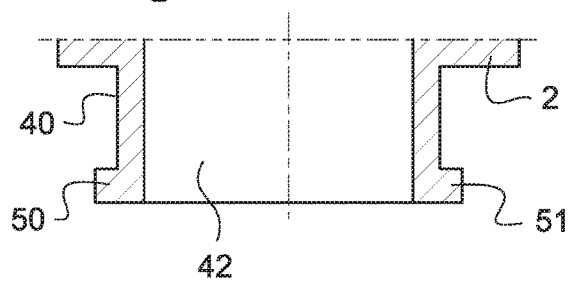
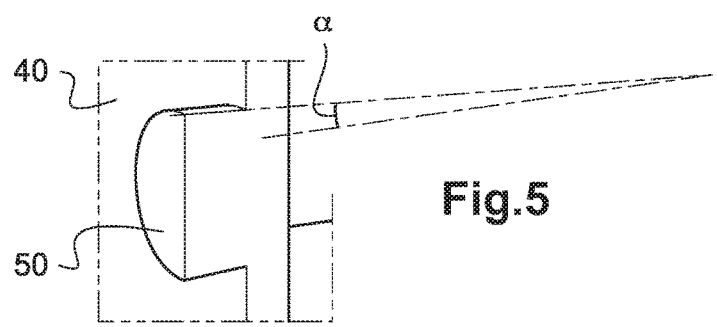

PLURALITY OF PLUGS WITH LOCKING LEVERS COUPLED TO A PLURALITY OF SOCKETS FORMED INTEGRALLY WITH AN ELECTRICAL EQUIPMENT BOX PANEL

CROSS-REFERENCE TO RELATED APPLICATIONS

This application claims priority to French Patent Application No. 1656515, filed Jul. 7, 2016. The disclosure of the priority application is incorporated in its entirety herein by reference.

TECHNICAL FIELD

The present invention concerns a connection system for connecting a plurality of plugs to an assembly comprising an electronic equipment box panel and a plurality of sockets each configured to be connected to a plug, which may be a plug integrating a cordless key for emission by wireless network, of wifi or Bluetooth® type, or a plug mounted on at least one cable, especially a plug comprising at least one optical conductor or one electrical conductor.

The invention applies in particular to electronic equipment implementing a plurality of optical channels with connections which are found in an outdoor environment and/or in harsh conditions, especially in telecommunications installations such as mobile telephony relay antennas, in high-speed data transmission networks for home or industry, in surveillance camera networks or even for data transmission in railway installations.

The invention also applies to industrial type connectors.

PRIOR ART

It is known, in the majority of electronic equipment intended to be installed in an outdoor environment where it is necessary to make connections between a cable-mounted plug and a corresponding socket, how to attach the socket to one of the panels of the equipment box.

In particular, the socket comprises a fixation plate which is screwed to the panel. The sockets may also be of circular shape, threaded with the body screwed directly in the panel or held by a nut. The body may also be assembled with force in the panel.

Besides the dedicated installation time, which may be long when the electronic equipment needs to implement a multitude of connectors, and thus sockets to be attached, it may prove to be difficult to achieve a satisfactory alignment between the electrical signal interface realized on a printed circuit card of the equipment and that of the socket, and thus the socket itself, despite the tolerances provided by the manufacturers.

What is more, new developments in installations in telecommunications in particular for the deployment of the standards 4G+, LTE+, or even the future 5G, are resulting in increasingly smaller electronic equipment with a more substantial number of functions, and thus cables conducting the signals and hence connection systems.

Now, reducing the size of the electronic equipment requires increasing the physical density of the connection systems associated with the equipment.

The aforesaid solution of sockets attached to an electronic equipment box panel is not helpful here, since by definition the dedicated means of removable fixation of the sockets have a minimum footprint.

Furthermore, the existing systems for locking of the plugs to the sockets likewise require a minimum footprint between two adjacent sockets.

In fact, in these systems a locking lever with two branches, each one supporting a locking slot, is mounted to pivot on each socket, with the slots fitting around locking lugs which are integrated in the body of the corresponding plug, thereby ensuring the locking of the plug to the socket in their connected configuration. Hence, this requires a minimum space dedicated to the placement of the locking lever, between two adjacent sockets.

Moreover, the risks of breakage due to the presence of locking levers integrated in sockets attached to equipment panels are significant.

There is a need to improve the systems for connecting a plurality of plugs to a multitude of connector sockets on a same panel of an electrical equipment box, in order to remedy some or all of the aforementioned drawbacks of the prior art, especially in order to reduce the footprint of the connectors on a panel, shorten the mounting time needed for their installation, and lessen the risks of breakage due to the levers of the systems for locking the plug to the socket.

The purpose of the invention is to meet this need at least in part.

Explanation of the Invention

To accomplish this, the invention concerns a connection system comprising:
 a plurality of connection plugs on each of which is mounted a locking lever with two arms each one supporting a locking hook of a locking system,
 an assembly comprising:
  an electrical equipment box panel, designed to lodge an electronic circuit card, the panel comprising a plurality of openings;
  a plurality of adjacent sockets, each one comprising a hollow tubular portion forming a rim projecting relative to the panel on the equipment side opposite the side where the electronic circuit card is arranged, each rim bearing two locking lugs of the locking system of a plug for locking to one of the sockets in their mutual connection configuration, the cavities of the tubular portions of the sockets defining the openings of the panel.

According to the invention, the plurality of sockets is monobloc with the equipment panel and the sockets of the monobloc assembly and the plugs are configured such that when each plug is connected to one of the sockets and locked to the latter by means of the locking lever in the position of attachment of the hooks to the locking lugs, two adjacent arms of adjacent plugs are in planar, pointlike or linear bearing against each other.

Thanks to the invention, one reduces the footprint needed for the connecting of several plugs to a same piece of electronic equipment, since the spacing between two distinct and adjacent connectors may be reduced.

This is made possible by eliminating the dedicated placement of means of removable fixation of the sockets to the box panel, as in the prior art, and decreasing the space needed for the locking systems.

By reversing the location of the locking levers as compared to the prior art, that is, by arranging them on the plugs, the inventors were able to integrate the complementary locking lugs directly on the sockets forming with the panel a monobloc assembly and by making them closer together, preferably joined together.

In other words, the invention makes it possible to increase the density of the connectors on the equipment, since as compared to the prior art it is possible to connect a larger number of plugs of connectors for a same length of equipment box panel.

The compactness due to a monobloc assembly of the sockets with the panel may even enable a planar, linear, or pointlike bearing of adjacent plugs by the arms of their respective locking lever. This is made possible because each locking lever is accessible manually by a technician from the top of the plug housing.

With any given connectors of known type SFP, optical, RJ45, power, data, or combination signals, the invention makes it possible to achieve a spacing between two adjacent sockets of the order of 26 mm.

A further advantage due to the fact that the plugs are bearing against each other is an increased mechanical strength for the connectors. In fact, when a lateral traction force is applied to a cord or cable connected to a plug, the latter will bear against the adjacent plug, which thus presents a counterforce to the lateral force.

The invention defines a kind of new mechanical interface of smaller footprint, enabling an effective mechanical fixation of each housing of the plurality of plugs to the equipment box, a pre-alignment of each plug with the electrical or optical interface mounted on an electronic circuit card (PCB) situated inside the equipment box, an electrical grounding connection of the cable connected to a plug with the equipment box, and tightness between the housing of each plug and the equipment box.

As for the electrical or optical interface, this enables the circulation of the electrical or optical signal or the electrical power supply current, or both at the same time, inside the equipment.

According to a variant embodiment, at least one of the plugs designed to be mounted on at least one cable comprising at least one optical conductor has a body and at least one optoelectronic converter secured in the body in a removable manner.

According to an advantageous embodiment, each socket may comprise one or more relief or hollow shapes in its cavity, adapted to fit together with one or more respective hollow or relief shapes at the free end of a given plug, designed to be connected to said socket, or vice versa.

According to this embodiment, at least one socket of the plurality of sockets comprises one or more reliefs or cavities of different dimensions and/or different arrangement as compared to that or those of another socket of the plurality of sockets. These relief and hollow shapes which are different between different versions of connectors (plugs and associated sockets) thus constitute means of poka yoke which may be specific to each version of connector. In other words, thanks to these complementary relief and hollow shapes, one accomplishes a physical coding, so that it is impossible to insert a plug of one version into a socket of another version or even to insert the correct plug wrongly. Such a physical coding is advantageous since it can prevent mistakes in making the connection by the technician, and also prevents damaging the signal interfaces which may have fragile parts, such as very fine contacts or optical faces.

Advantageously, each socket may likewise comprise one or more inscriptions in relief or recessed and/or one or more colour zones, on the outside of its cavity, the inscription(s) and/or colour zone(s) corresponding to those of a given plug which is designed to be connected to said socket. These inscriptions thus constitute a visual coding between plug and socket of a same version. This visual coding may advantageously complete the aforesaid physical coding. Thus, since the sockets form a monobloc assembly with the electronic equipment panel, having colour markings corresponding to the associated plugs allows the technician to quickly ascertain visually which plug needs to be connected in which interface.

Preferably, the colours may be chosen according to the current standards and conventions in the field of connectors. For example, one may inscribe a blue zone for monomode optical connections, green for multimode optical connections, orange for electrical power supply connections, and so on.

The invention likewise concerns, in another of its aspects, a monobloc assembly intended for a connection system as described above, the plurality of sockets being moulded integrally with the panel.

Preferably, the locking lugs are continuous between adjacent sockets. One thus achieves greater compactness.

According to an advantageous feature, the outer edges and the cavity of each rim comprise at least one clearance. Preferably, the interior clearance of the cavity is adapted to cooperate with the exterior of the body of a plug.

According to an advantageous embodiment, each locking lug comprises a zone of contact with a locking hook of a locking lever of one of the plugs in the locking position, the zone of contact having at least one clearance, or a straight inclined slope, or a curved slope adapted to generate, when attaching the hooks to said lugs, force components directed toward each other so as to mutually bring together the lever arms of the plug. This makes it possible to increase the locking force of a plug with the socket to which it is connected.

The clearance of the contact zone may have an exterior shape of a truncated cone, the vertex of the cone pointing toward the cavity of the socket which carries it.

According to a variant embodiment, each rim of a socket integrates at its free end a lip projecting from the connection face with a plug, the lip being adapted to protect mechanically and/or against light from the outside environment a seal inserted between socket and plug.

The lip may be a continuous profile all around the cavity of the socket.

DETAILED DESCRIPTION

Other advantages and features of the invention will better emerge upon perusal of the detailed description of exemplary embodiments of the invention provided as an illustration and not a limitation, referring to the following figures, among which:

FIG. 3 is a perspective view of an exemplary embodiment of a plug designed to be connected to one of the sockets of the assembly according to the invention, having an optical cable mounted on it;

FIG. 4 is a detailed perspective view of one of the sockets of the assembly according to the invention;

FIG. 4A is a cross sectional view of the socket of FIG. 4;

FIG. 5 is a detailed perspective view of a locking lug integrated in one of the sockets of the assembly according to the invention;

Figure 1:
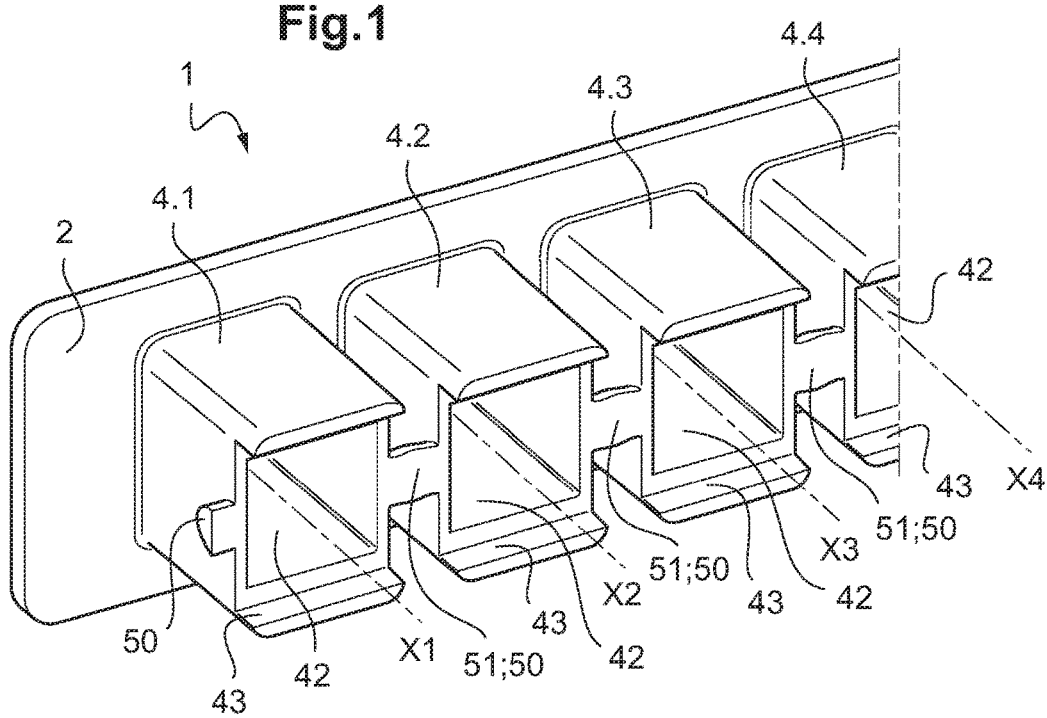
FIG. 1 is a partial perspective view of a first exemplary embodiment of the invention, FIG. 1 showing an assembly with electrical equipment box panel moulded integrally with a plurality of aligned sockets.

FIGS. 10A to 10B to 13A to 13B likewise show several plugs of other versions and the sockets to which only one plug of one of the other versions may be connected.

The connection system according to the invention comprises a monobloc assembly represented in FIG. 1, denoted overall as 1, and a plurality of plugs 6 which may be of a different version from each other, as that represented in FIG. 3, described below.

The monobloc assembly 1 according to the invention is designed to be integrated in a piece of electronic equipment configured to receive a plurality of optical, electrical, power signals, or any combination of these signals. To do so, the equipment lodges an electronic circuit card, as described below.

This assembly 1 comprises first of all a panel 2 of the electrical equipment box in which the electronic card 3 is designed to be lodged, as well as a plurality of sockets 4.1, 4.2, 4.3, 4.4, 4.5 which are adjacent and aligned in a single row.

Each socket 4.1, 4.2, 4.3, 4.4, 4.5 extends along a longitudinal axis X1, X2, X3, X4, X5 and comprises a tubular hollow portion 40 forming a rim projecting with respect to the panel 2 on the side of the equipment opposite the side where the electronic circuit card 3 is arranged.

Figure 2:
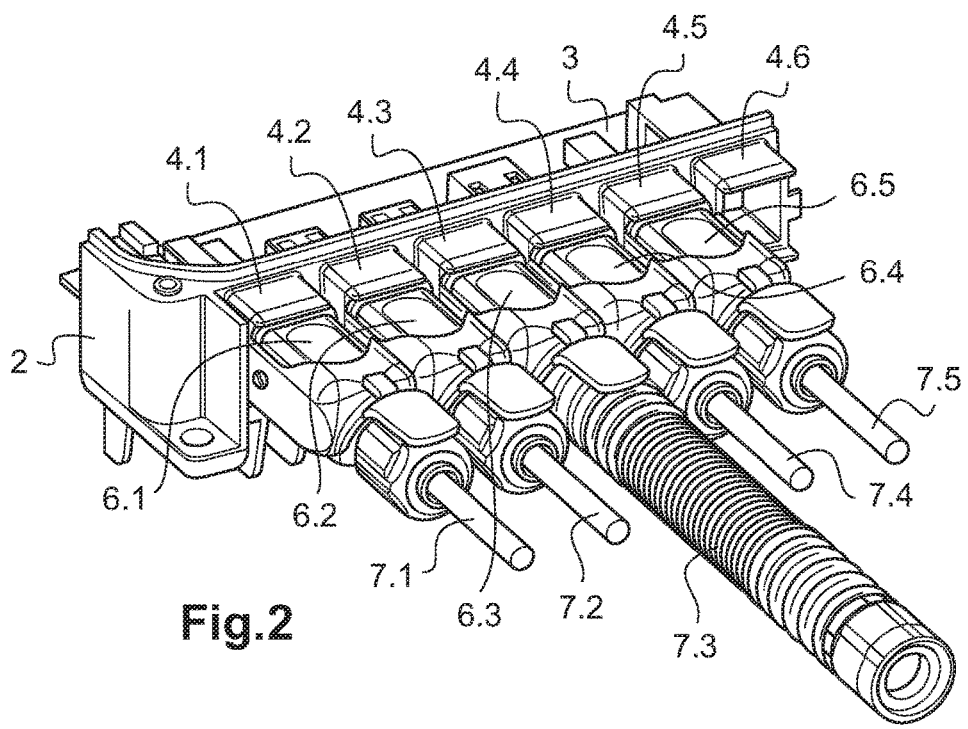
FIG. 2 is a perspective view of an assembly according to FIG. 1 implemented in a piece of electronic equipment, FIG. 2 showing a plug connected to each socket and in a configuration locked to it by a locking system according to the invention.

According to the invention, as illustrated in FIGS. 1 and 2, the plurality of sockets 4.1, 4.2, 4.3, 4.4, 4.5 is moulded integrally with the panel 2, the cavities 42 of the tubular portions of the sockets defining the openings of the panel.

Furthermore, each rim of a socket 40 carries two locking lugs 50, 51 of a locking system 5 for locking a plug 6.1, 6.2, 6.3, 6.4, 6.5 to one of the sockets in their configuration of mutual connection, each plug 6.1, 6.2, 6.3, 6.4, 6.5 being mounted on an independent cable 7.1, 7.2, 7.3, 7.4, 7.5.

All the locking lugs 50, 51 are continuous between adjacent sockets.

One example of a plug 6.1 designed to be connected to one of the sockets 4.1, 4.2, 4.3, 4.4, 4.5 of the assembly 1 according to the invention is shown in FIG. 3.

This plug 6 may be designed to be mounted on a single cable 7.1 having only optical conductors. The plug 6 has a body 60 which can be made of several pieces and which extends along a straight longitudinal axis A.

The body 60 may be made for example of aluminium or zamak, pressure moulded, coated with an anticorrosive protection, or even of plastic material(s), with or without metallization. It may also be machined or made by an additive fabrication technology.

The mounting of the plug 6.1 on the cable 7.1 may be facilitated by a piece 9, designed to be placed at the rear end of the plug 6. As illustrated in FIG. 3, this piece 9 is, for example, a packing gland for retention of the cable 7.1.

An optoelectronic converter 10, also known as a transceiver, may be secured in a removable and interchangeable manner inside a seat of the body 60 provided for this purpose. The transceiver 10 is disposed for example in the seat in the area of the front end 61 of the body 60, the transceiver having the shape of a beak which is intended to be introduced inside the electronic equipment 3. One may refer advantageously to patent application WO 2012/101569 which describes and claims the removable and interchangeable fixation of the transceiver 10.

In the example illustrated, the optoelectronic converter 10 is in contact with the body 60 of the plug 6, such that the housing of this optoelectronic converter 10 is at the same electrical potential as the body 60 of the plug 6.

One or more optical contacts may be connected at one end to an optical conductor, particularly an optical fibre, of the cable 7 and connected at their other end to an input of the transceiver 10. The optical contacts are, for example, contacts of LC type and the optoelectronic converter 10 is for example a transceiver of SFP type.

As illustrated in FIG. 3, a locking lever 62 with two arms 63, 64 is mounted to pivot about an axis 65 on the body 60 of the plug.

The free end of each arm 63, 64 comprises a locking hook 66, 67.

As can be seen in this FIG. 3, the lever 62 may have a grasping portion 68 which enables an easy manual pivoting of the lever 62 about the axis 65.

FIGS. 4, 4A and 5 show in more detail a socket 4 according to the invention.

The exterior edges 41 and the cavity 42 of each rim 40 of the socket comprise at least one clearance in the case of a moulded embodiment. The interior clearance of the cavity 42 cooperates with the exterior of the body 60 of the plug.

Each rim 40 of a socket preferably integrates at its free end a lip 43 projecting from the connection face with a plug. The lip 43 affords mechanical protection against the outside environment for a seal 8 inserted between socket 4 and plug 6.

Figure 8:
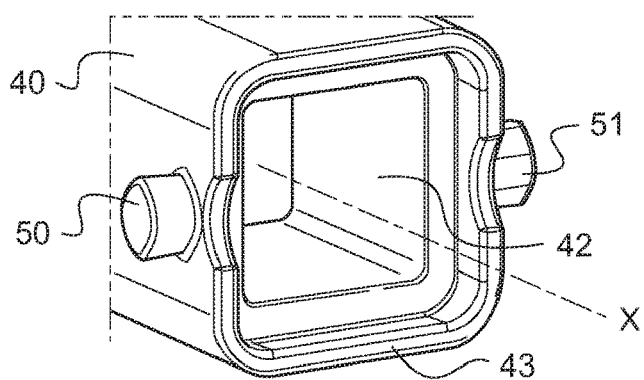
FIG. 8 is a perspective view of a variant embodiment of a socket of an assembly according to the invention.
Figure 9A:
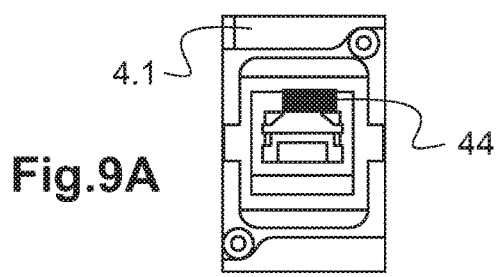
FIGS. 9A and 9B show, in front view, respectively a plug of a given version and a socket to which only the plug of the given version may be connected.
Figure 9B:
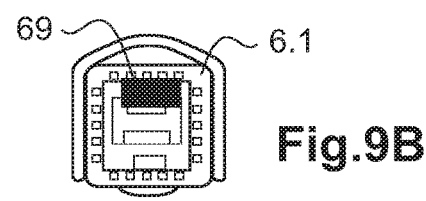
Figure 10A:
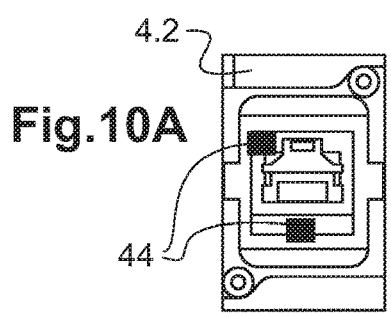
Figure 10B:
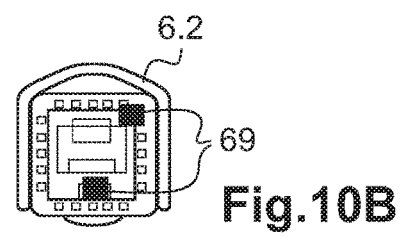
Figure 11A:
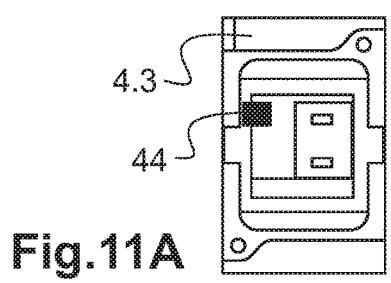
Figure 11B:
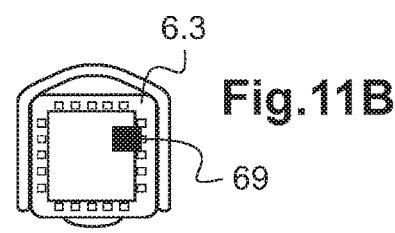
Figure 12A:
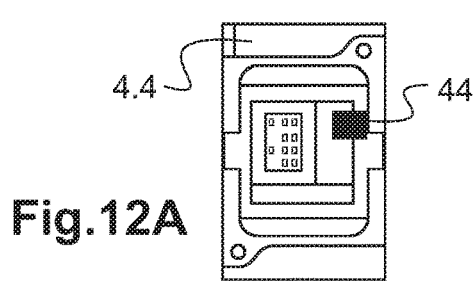
Figure 12B:
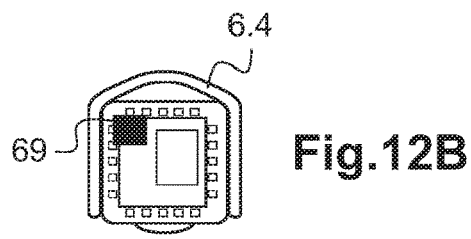
Figure 13A:
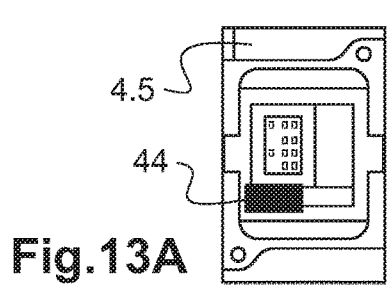
Figure 13B:
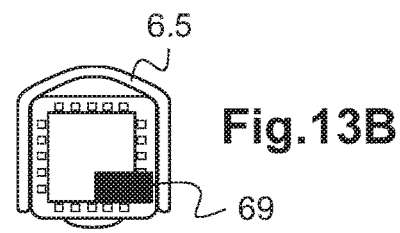

As illustrated in FIG. 8, this lip 43 may advantageously be a continuous profile all around the cavity 42 of the socket. This profile may be easily produced during the moulding of the assembly 1 according to the invention.

Each locking lug 50, 51 may advantageously have an exterior shape of a truncated cone, the vertex of the cone pointing toward the cavity 42 of the socket which carries it. Thus, as illustrated in FIG. 5, the half-angle of the truncated cone a may have a value of the order of 4°.

Figure 6:
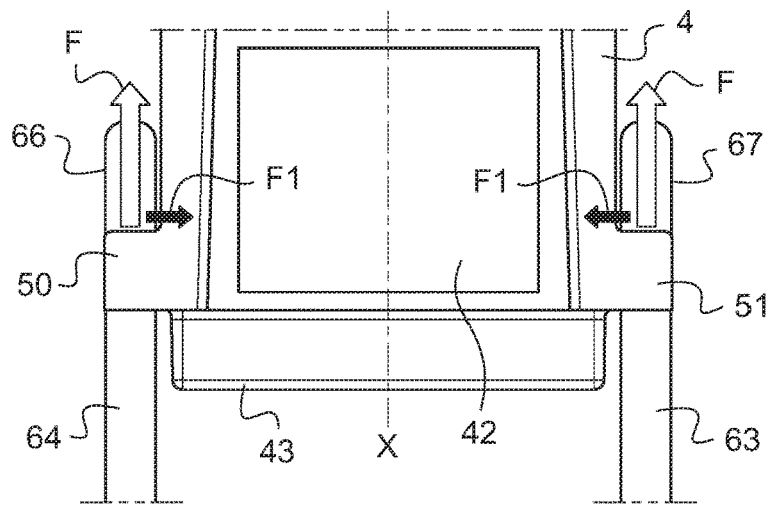
FIG. 6 is a cross sectional view of one of the sockets of the assembly according to the invention with a locking lever integrated in the plug in a configuration locked to the two locking lugs of the socket.

There is shown schematically in FIG. 6 the advantage of having locking lugs 50, 51 in the shape of a truncated cone. When a locking lever 62 is attached by its hooks 66, 67 around two lugs 50, 51 of a socket 4, these latter exert a traction force along arrows F.

Because of the clearances of the lugs 50, 51, the traction force results in force components along arrows F1. These force components F1 directed toward one another have a tendency to mutually bring together the branches 63, 64 of the lever 62 and thus increase the locking force of the plug 6 to its socket to which it is connected.

Figure 7:
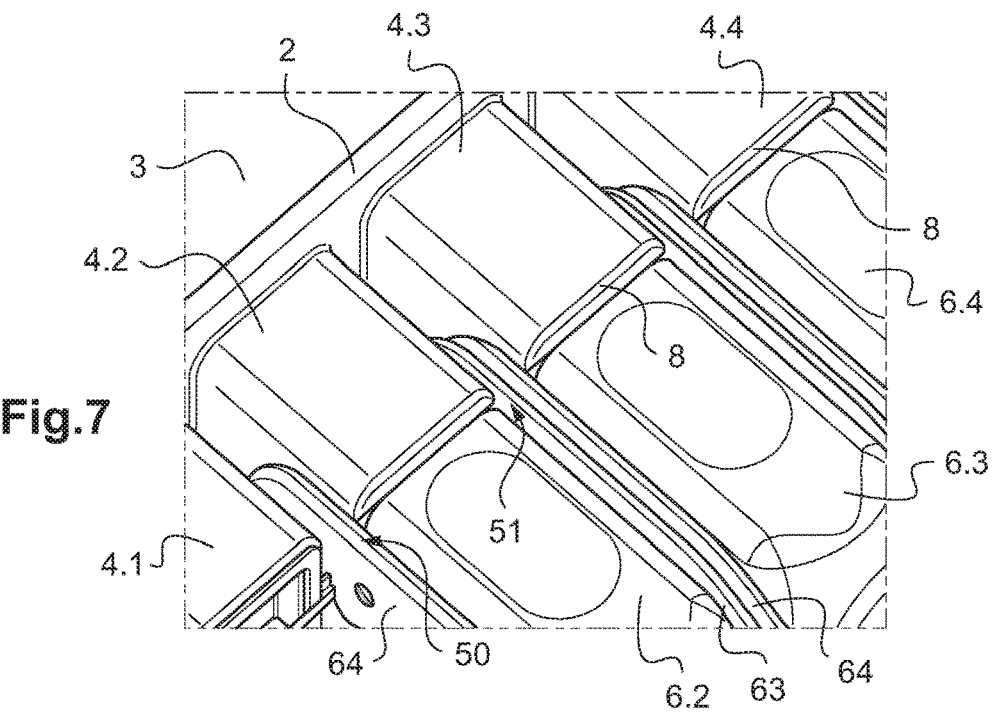
FIG. 7 is a detailed perspective view of FIG. 2, FIG. 7 showing the relative arrangement of the adjacent locking levers, as well as the positioning of the seals between plugs and associated sockets in their configuration connected and locked to one another.

FIG. 7 clearly shows that the lips 43 of the rims 40 of the socket indeed protect the seals 8 mechanically and/or against light from the outside environment. Thus, they are less exposed directly to UV light and the elements.

In FIG. 7, one also clearly distinguishes the configuration when each plug 6.2, 6.3, 6.4 is connected to one of the sockets 4.1, 4.2, 4.3 and locked to the latter by means of the locking lever 6 in the position of attachment of the hooks 66, 67 to the locking lugs 50, 51.

Two adjacent arms 63, 64 of two adjacent levers 6 bear against each other in a planar manner. This is particularly advantageous, for besides the very compact appearance of the installation of the plugs, this enables increased mechanical strength of the connectors. In fact, if a lateral traction force is applied to a cable 7 connected to a plug 6, this will bear against the adjacent plug, which thus presents a counterforce to the lateral force.

FIG. 8 shows an advantageous variant of the lip 43 which is a continuous profile all around the cavity 42 of the socket 4.

FIGS. 9A and 9B to 13A to 13B show different versions of plugs intended to be connected each to its corresponding socket.

As shown schematically in these figures by means of black rectangles, each plug 6.1 to 6.5 may integrate on its connection face one or more reliefs or cavities 69 having dimensions and arrangement which is unique so that it can only be fitted together with one or more reliefs 44 of complementary shape and dimensions on the corresponding socket 4.1 to 4.5.

Thus, respectively:
the plug 6.1 integrating a transceiver 10 of SFP type may only be connected to the corresponding socket 4.1,
the plug 6.2 integrating a male connector end of RJ45 type may only be connected to the corresponding socket 4.2,
the plug 6.3 integrating contacts for power signals may only be connected to the corresponding socket 4.3,
the plug 6.4 integrating contacts for data signals may only be connected to the corresponding socket 4.4,
the plug 6.5 integrating contacts for audio and/or video signals may only be connected to the corresponding socket 4.4, In other words, even if in certain configurations the signal interfaces of a plug of one type may still make contact with a socket of a different type for which the plug is not intended, it is impossible for the technician to insert the plug of one type into the socket of this other type or to insert the plug of the correct version in a wrong way.

Thus, thanks to the physical coding realized by complementary reliefs or cavities 44, 68, mistakes in making the connection by the technician are prevented, and also any damaging of the signal interfaces which are sensitive to impact, being fragile, such as very fine contacts or optical faces.

The plurality of plugs and sockets of the assembly according to the invention may be configured to operate at temperatures between −40° C. and +125° C.

In terms of tightness, the plugs and/or the sockets can satisfy standard IP65, IP 67, IP68, or UL50E.

The locking and unlocking process, as well as the connecting and disconnecting of each of the plugs 6 with its corresponding socket as described above, may be particularly simple.

The assembly 1 just described according to the invention is able to produce a large number of connections on a reduced panel surface, in particular with a spacing between adjacent sockets 4 of the order of 26 mm, which thus allows an increased density of connections on a piece of electronic equipment.

Other variants and advantages of the invention may be realized without thereby leaving the scope of the invention.

The invention is not limited to the examples just described; in particular, one may combine the features of the examples illustrated within variants which have not been illustrated.

The invention claimed is:

1. A connection system comprising:
a plurality of connection plugs on each of which is mounted a locking lever with two arms each one supporting a locking hook of a locking system,
an assembly comprising:
an electrical equipment box panel, designed to lodge an electronic circuit card, the electrical equipment box panel comprising a plurality of openings;
a plurality of adjacent sockets, each one comprising a hollow tubular portion forming a rim projecting relative to the electrical equipment box panel on an equipment side opposite the side where the electronic circuit card is arranged, each rim bearing two locking lugs of the locking system of a plug for locking to one of the sockets in a mutual connection configuration, cavities of the tubular portions of the sockets defining openings of the electrical equipment box panel;
wherein the plurality of sockets is monobloc with the electrical equipment box panel and in that the sockets of the assembly and the plugs are configured such that when each plug is connected to one of the sockets and locked to the latter by means of the locking lever in a position of attachment of the hooks to the locking lugs, two adjacent anus of adjacent plugs are in a planar, point like or linear bearing against each other.

2. The connection system according to claim 1, wherein at least one of the plugs designed to be mounted on at least one cable comprising at least one optical conductor has a body and at least one optoelectronic converter secured in the body in a removable manner.

3. The connection system according to claim 1, wherein each socket comprises one or more relief or hollow shapes in a cavity, adapted to fit together with one or more respective hollow or relief shapes at a free end of a given plug designed to be connected to said socket, or vice versa.

4. The connection system according to claim 3, wherein at least one socket of the plurality of sockets comprises one or more reliefs or cavities of different, dimensions and/or different arrangement as compared to that or those of another socket of the plurality of sockets.

5. The connection system according to claim 1, wherein each socket comprises one or more inscriptions in relief or recessed and/or one or more colour zones, on the outside of its cavity, the inscription(s) and/or colour zone(s) corresponding to those of a given plug which is designed to be connected to said socket.

6. A monobloc assembly, intended for a connection system according to claim 1, wherein the plurality of sockets is moulded integrally with the electrical equipment box panel.

7. The monobloc assembly according to claim 6, wherein the locking lugs are continuous between adjacent sockets.

8. The monobloc assembly according to claim 6, wherein outer edges and the cavity of each rim comprise at least one clearance.

9. The monobloc assembly according to claim 8, wherein an interior clearance of the cavity is adapted to cooperate with an exterior of the body of a plug.

10. The monobloc assembly according to claim 6, wherein each locking lug comprises a zone of contact with a locking hook of a locking lever of one of the plugs in the locking position, the zone of contact having at least one clearance, or a straight inclined slope, or a curved slope adapted to generate, when attaching the hooks to said lugs force components directed toward each other so as to mutually bring together the lever arms of the plug.

11. The monobloc assembly according to claim 10, wherein the clearance of the contact zone of the lug has an exterior shape of a truncated cone, a vertex of the truncated cone pointing toward the cavity of the socket which carries it.

12. The monobloc assembly according to claim 6, wherein each rim of a socket integrates at a free end of the socket a lip projecting from a connection face with a plug, the lip being adapted to protect mechanically and/or against light from an outside environment a seal inserted between socket and plug.

13. The monobloc assembly according to claim 12, wherein the lip is a continuous profile all around the cavity of the socket.

* * * * *